UNITED STATES PATENT OFFICE.

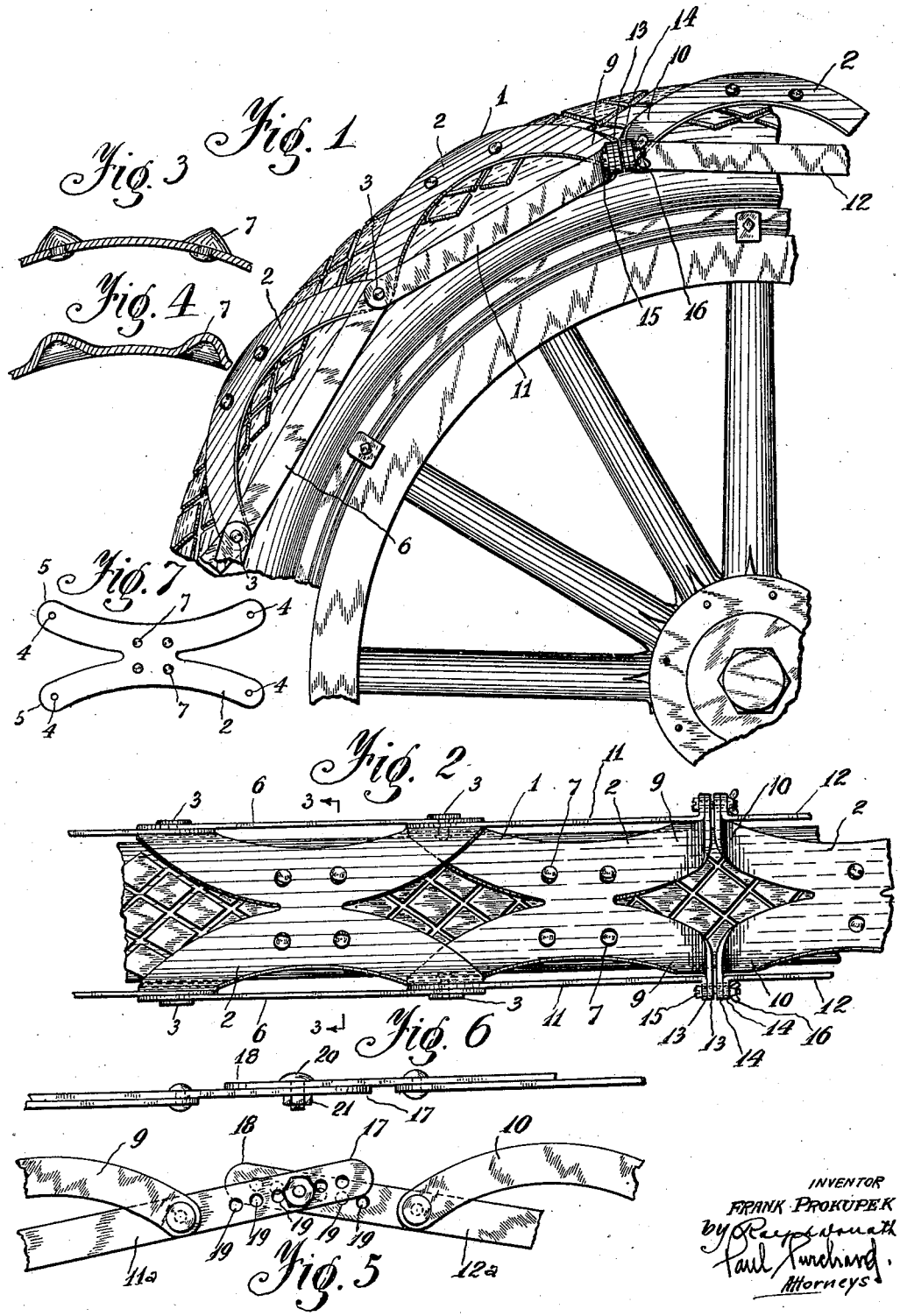

FRANK PROKUPEK, OF MILLVALE, PENNSYLVANIA.

ANTISKID DEVICE AND TIRE PROTECTOR.

1,407,298.  Specification of Letters Patent.  Patented Feb. 21, 1922.

Application filed March 17, 1921. Serial No. 453,098.

*To all whom it may concern:*

Be it known that I, FRANK PROKUPEK, a citizen of Czecho-Slovakia, residing at Millvale, in the county of Allegheny and State of Pennsylvania, have invented certain new and useful Improvements in Antiskid Devices and Tire Protectors, of which the following is a specification.

This invention relates to anti-skidding devices and tire protectors, used especially on automotive vehicles using pneumatic tires.

One of the principal objects of this invention is to provide such a device which is of simple construction and manufacture and which can be produced at low cost. Another object is to provide an anti-skidding device built up of metal stampings and offering a greater amount of protection to the tires than the commonly used anti-skidding tire chains. Still a further object is to provide such a device which can be readily applied to wheels with pneumatic tires and which will be securely held thereon without the assistance of chains or other means passed around the felly of the wheel. Further objects and advantages will appear from the following description and the drawings which form a part of this application.

In the drawings:

Fig. 1 is a fractional side elevation showing my device as applied to an automobile wheel.

Fig. 2 is an edge view showing a part of a wheel provided with my anti-skidding device.

Fig. 3 is an enlarged cross-section taken along line 3—3, Figure 2.

Fig. 4 is a modified construction intended to replace the one shown in Figure 3.

Fig. 5 is a partial side view showing a modified construction for the two end-links used in my anti-skidding device.

Fig. 6 is a top view corresponding to Figure 5.

Fig. 7 is a plan view showing the preferred form of a link as blanked out from a sheet of metal.

Referring to the drawings, my anti-skidding device consists of an endless chain 1, composed of the individual members 2, stamped and formed out of sheet metal of any suitable thickness and having the substantially X shaped form shown in Figure 7. These members are hingedly connected together by means of pins or rivets 3 inserted through suitable apertures 4, provided adjacent the end of the arms 5, of the members.

For the purpose of increasing the strength of the anti-skidding device and of holding the latter more securely onto the pneumatic tire, the members are connected on both sides of the tire by means of the links 6, flexibly secured thereto by means of the rivets or pins 3.

The members 2 are provided with a plurality of knobs 7 which may be either riveted thereon as shown in Figure 3 or depressed as shown in Figure 4, for the purpose of providing better engagement of my anti-skidding device with the ground.

For tires of standard sizes, I intend to construct my anti-skidding device of such a length that it will surround the tire to within a fraction of an inch, so that the construction shown in Figures 1 and 2 may be employed to unite the two end members of the anti-skidding device. With this object in view, I provide on the terminal members 9 and 10 and on their corresponding links 11 and 12 the rectangularly and outwardly disposed ears 13 and 14 suitably perforated to accommodate the bolts 15 provided with the wing nuts 16.

If my device is to be applied on over-sized tires, the construction of the end members and end connecting links is modified in the manner illustrated in Figures 5 and 6. As will be seen from these Figures, the modification consists in that the end links 11ᵃ and 12ᵃ are extended beyond the point of junction of said links with the terminal members 9 and 10. The extensions 17 and 18 are provided with a plurality of longitudinally disposed holes 19, suitably spaced to provide a sufficiently close adjustment to take care of the variations in the circumference of the tires. When applied to a tire, the ends are approached as close as possible and, when two holes in the extensions 17 and 18 coincide, a round headed bolt 20 is inserted therethrough and the two ends are securely held together by means of the threaded nut 21.

My anti-skidding device is preferably to be used permanently on tires, that is to say it is to remain until the tire or the anti-skidding device itself is worn out.

To apply my device, the wheel is first raised a certain amount off the ground and the tire is partially deflated and the open anti-skidding device is passed around the tire and finally connected by means of the bolts 15 or 20, as the case may be. The tire is now inflated to the required pressure and the anti-skidding device will be securely held thereon by the concave shape of the individual members and by the lateral connecting links.

It may be found desirable in practice to resort to slight changes in construction and arrangement of the details of my invention without departing from the field and scope of the same, and I intend to include all such variations, as fall within the scope of the appended claim, in this application in which a preferred form only of my invention is disclosed.

What I claim is:

An anti-skidding device of the character described, composed of a plurality of X-shaped members stamped integrally from a sheet of metal, said members being curved to conform to the shape of the tire and having arms extending laterally of the sides of said tire, for the protection thereof; links connecting the ends of the co-lateral arms of each X-shaped member; registering apertures provided in the ends of said arms and links; hinge-pins inserted through said apertures, and bolts engaging said apertures provided in the juxtaposed arms of the end-members of said hinged-members.

In testimony whereof I affix my signature.

FRANK PROKUPEK.